(12) United States Patent
Padula

(10) Patent No.: US 7,793,965 B2
(45) Date of Patent: Sep. 14, 2010

(54) TRAILER STEERING SYSTEM FOR A TRACTOR/TRAILER COMBINATION

(76) Inventor: Santo A. Padula, 4086 Turnberry Dr., Medina, OH (US) 44256

( * ) Notice: Subject to any disclaimer, the term of this patent is extended or adjusted under 35 U.S.C. 154(b) by 632 days.

(21) Appl. No.: 11/705,331

(22) Filed: Feb. 12, 2007

(65) Prior Publication Data

US 2007/0216134 A1    Sep. 20, 2007

Related U.S. Application Data

(60) Provisional application No. 60/772,396, filed on Feb. 10, 2006.

(51) Int. Cl.
B62D 53/06    (2006.01)
(52) U.S. Cl. ................. 280/426; 280/442; 280/443
(58) Field of Classification Search .............. 280/426, 280/442, 443
See application file for complete search history.

(56) References Cited

U.S. PATENT DOCUMENTS

| | | | | |
|---|---|---|---|---|
| 4,244,596 A * | 1/1981 | Chung | ............ | 280/426 |
| 4,463,966 A * | 8/1984 | Stoddard | ............ | 280/442 |
| 4,768,802 A * | 9/1988 | Winkler | ............ | 280/426 |
| 4,955,630 A * | 9/1990 | Ogren | ............ | 280/419 |
| 4,982,976 A * | 1/1991 | Kramer | ............ | 280/426 |
| 5,033,763 A * | 7/1991 | Daenens et al. | ............ | 280/426 |
| 5,123,669 A * | 6/1992 | Ducote | ............ | 280/426 |
| 5,197,751 A * | 3/1993 | Rankel | ............ | 280/426 |
| 5,201,836 A * | 4/1993 | DeWitt | ............ | 280/426 |
| 5,244,226 A * | 9/1993 | Bergh | ............ | 280/442 |
| 5,282,641 A * | 2/1994 | McLaughlin | ............ | 280/432 |
| 5,329,451 A * | 7/1994 | Notsu | ............ | 701/41 |
| 5,364,116 A * | 11/1994 | Houle et al. | ............ | 280/442 |
| 5,417,299 A * | 5/1995 | Pillar et al. | ............ | 180/412 |
| 5,479,999 A * | 1/1996 | Proia | ............ | 180/24.01 |
| 5,523,947 A * | 6/1996 | Breen | ............ | 701/36 |
| 5,536,030 A * | 7/1996 | Bettini | ............ | 280/433 |
| 5,558,350 A * | 9/1996 | Kimbrough et al. | ............ | 280/426 |
| 5,579,228 A * | 11/1996 | Kimbrough et al. | ............ | 701/41 |
| 5,607,028 A * | 3/1997 | Braun et al. | ............ | 180/408 |
| 5,630,604 A * | 5/1997 | Ducote | ............ | 280/426 |
| 5,873,592 A * | 2/1999 | Daenens | ............ | 280/410 |
| 6,152,475 A * | 11/2000 | Poole | ............ | 280/426 |
| 6,257,611 B1 * | 7/2001 | Muldoon | ............ | 280/442 |
| 6,273,446 B1 * | 8/2001 | Paul | ............ | 280/448 |
| 6,308,976 B1 * | 10/2001 | Mitchell | ............ | 280/419 |
| 6,431,576 B1 * | 8/2002 | Viaud et al. | ............ | 280/442 |
| 6,450,523 B1 * | 9/2002 | Masters et al. | ............ | 280/426 |
| 6,494,476 B2 * | 12/2002 | Masters et al. | ............ | 280/426 |
| 6,854,557 B1 * | 2/2005 | Deng et al. | ............ | 180/445 |
| 2002/0180178 A1 * | 12/2002 | Masters et al. | ............ | 280/426 |
| 2006/0145450 A1 * | 7/2006 | Metternich et al. | ............ | 280/433 |

* cited by examiner

*Primary Examiner*—Lesley Morris
*Assistant Examiner*—Michael R Stabley
(74) *Attorney, Agent, or Firm*—Renner, Kenner, Greive, Bobak, Taylor & Weber

(57) ABSTRACT

A tractor/trailer combination wherein a trailer is connected to a tractor through the connection of a kingpin with a fifth wheel is provided with a trailer steering system. Using given dimensions of the tractor/trailer combination and a measured articulation angle between the tractor and trailer during a turn, the wheels of the rear axles of the trailer are turned so that they turn approximately about the instant center established for the tractor. In this way, the trailer turns around approximately the same point as does the tractor, thus significantly eliminating off tracking.

7 Claims, 8 Drawing Sheets

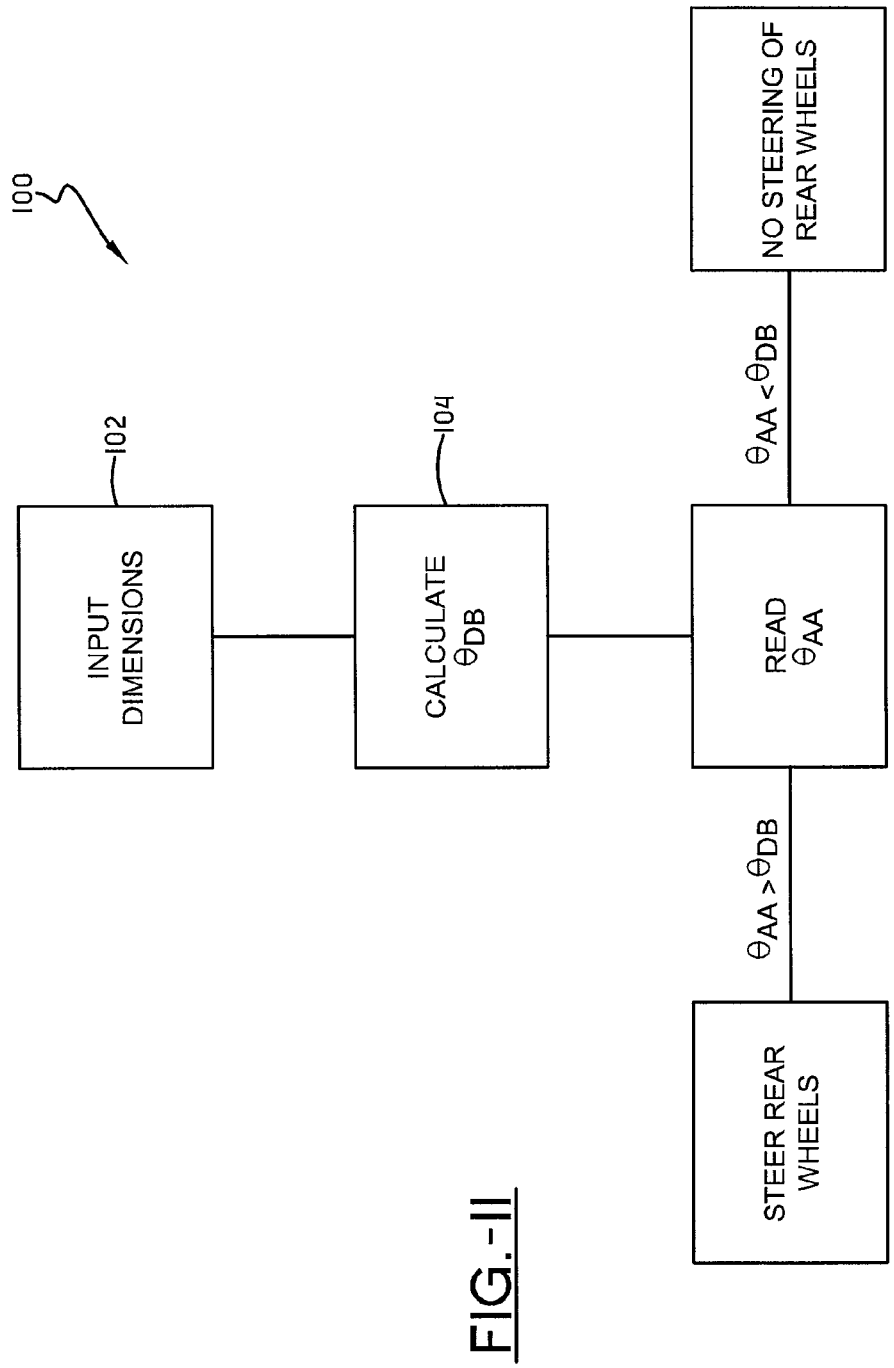

TRAILER STEERING SYSTEM FOR A TRACTOR/TRAILER COMBINATION

RELATED APPLICATIONS

This application claims the benefit of U.S. Provisional Patent Application No. 60/772,396 filed on Feb. 10, 2006.

BACKGROUND OF THE INVENTION

The present invention generally relates to steering systems, and more particularly, to a steering system for a trailer in a tractor/trailer combination.

A general illustration of a typical tractor/trailer combination 10 is shown in FIGS. 1 and 2. The trailer 12 is pivotally connected to the tractor 14 at the junction of the fifth wheel 16 and the kingpin 18, as generally known.

As seen in FIG. 2, the outside wheels of the tractor 10 generally follow the path 20 and the inside rear wheels generally follow the path 22. The inside rear wheels of the trailer 12 follow the path 24. This illustrates that, during a turn, the back end of the trailer 12 takes a path that is significantly offset from the path followed by the front of the tractor 14. As a result of such off tracking, the rear of the trailer 12 can undesirably ride over a curb even though the tractor 14 properly steers around the curb. By steering the rear wheels of the trailer 12 in a direction opposite the turning of the front wheels of the tractor 14, the amount of off tracking can be significantly reduced.

Although attempts have been made to steer the rear wheels of a trailer in a tractor/trailer combination to reduce jackknifing and off tracking, they have not been commercially successful. Examples of such systems are included in U.S. Pat. Nos. 4,244,596; 4,463,966; 4,768,802; 4,955,630; 5,282,641; 5,329,451; 6,450,523; and 6,494,476. In order to provide systems that might be considered commercially viable, the present invention provides novel structures for reading data indicative of the steering of the tractor and steering the rear wheels of the trailer in accordance with the steering data and given specifications of the particular tractor/trailer combination.

SUMMARY OF THE INVENTION

A trailer steering system for a tractor/trailer combination wherein a trailer is connected to a tractor through the connection of a kingpin with a fifth wheel, the trailer steering system including a rear axle on the trailer having steerable wheels; means for measuring an articulation angle between the tractor and the trailer during a turn; a microprocessor for calculating a desired counter-steering angle for the steerable wheels of the rear axle, based upon the articulation angle measured by said means for measuring an articulation angle, with the caveat that a counter-steering angle is only calculated when the articulation angle is greater than a set threshold angle.

BRIEF DESCRIPTION OF THE DRAWINGS

FIG. 11 is a flow chart that generally describes the trailer steering system of this invention.

PREFERRED EMBODIMENT FOR CARRYING OUT THE INVENTION

This invention provides a steering system for a tractor/trailer combination 10. More particularly, this invention provides elements for reading the articulation angle between a tractor 14 and a trailer 12 and steering the rear wheels of the trailer 12 so that the turning radius of the trailer 12 will closely mimic the turning radius of the tractor 14, thus reducing the occurrence of jackknifing and off tracking.

The present invention seeks to adjust the turning radius of the trailer 12 to closely mimic the turning radius of the tractor 14 by using geometric relationships to calculate the degree the rear axles or wheels of the trailer 12 must be steered. The geometric relationships will be covered herein below. However, the mechanisms employed to read an articulation angle and accordingly steer the rear axles or wheels of the trailer 12 are first disclosed. It should be appreciated that these mechanisms could be employed to steer the rear axles or wheels in accordance with any desired criteria.

Figure 1:
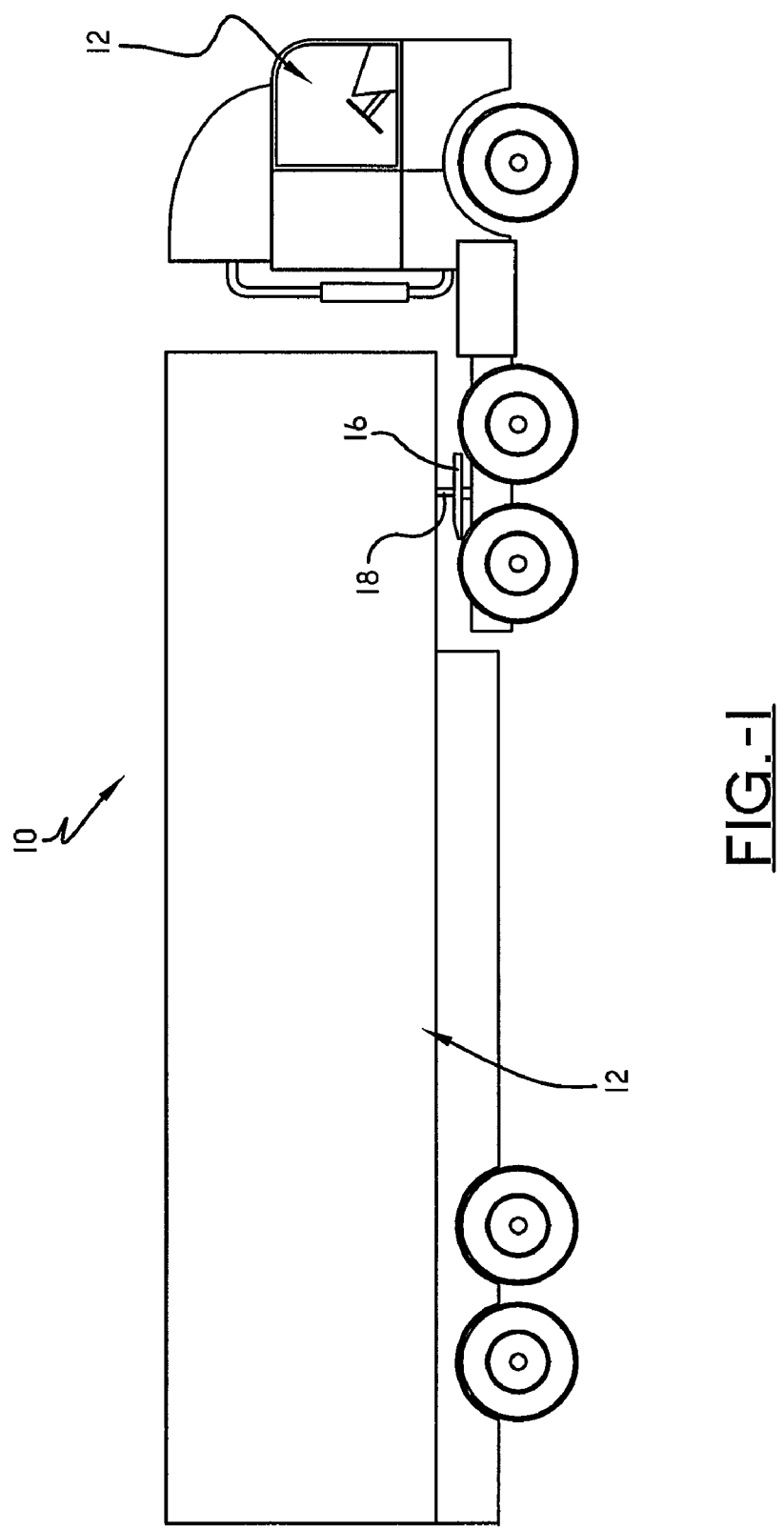
FIG. 1 is a general illustration of a typical tractor/trailer combination.
Figure 2:
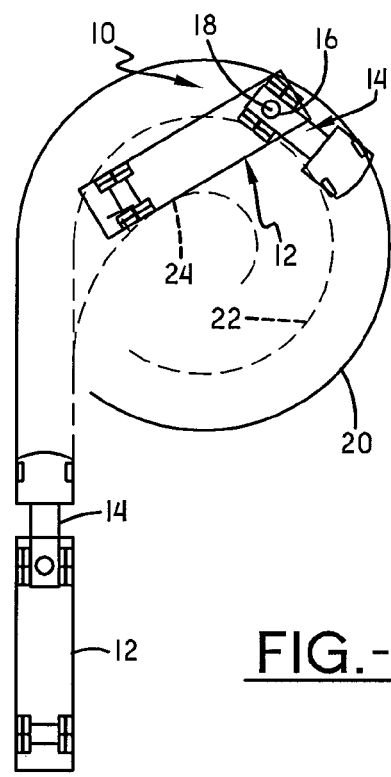
FIG. 2 is a general representation of a tractor/trailer combination during a turn.
Figure 3:
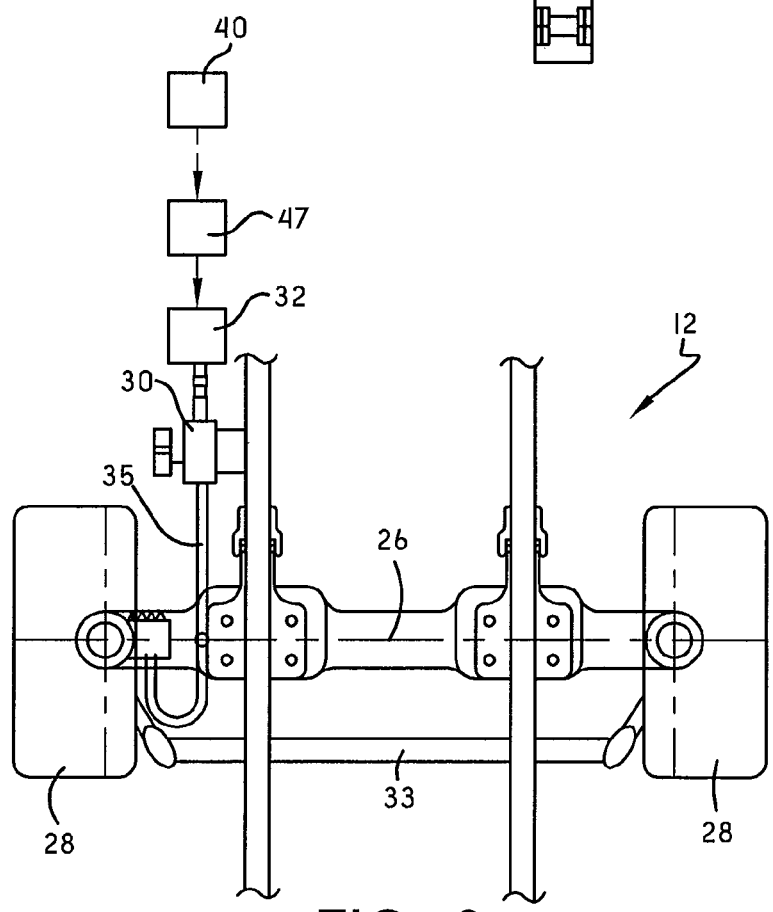
FIG. 3 is a top plan view of a single rear axle of the trailer, shown with a steerable axle and steering mechanism in accordance with this invention.

As seen in FIG. 1, it is common for tractor/trailers 10 to have multiple rear axles on both the tractor 14 and trailer 12. Two tractor rear axles are shown for trailer 14 (as implied by the two rear wheels shown). Referring now to FIG. 3, a trailer rear axle and associated wheels are shown with modifications in accordance with this invention. More particularly, the rear axle and wheels of a trailer 12 are modified to provide axle 26 with associated steerable wheels 28 that are caused to steer by means of a steering gear box 30 (with a pitman arm or a drag link connection 35), similar to the axle and gear box commonly provided on the tractor 14 front axle. A tie rod 33 interconnects the wheels 28 in standard fashion, as shown. A stepper motor 32 operates the steering gear box 30. An input shaft 34 connects the steering gear box 30 and the stepper motor 32. The direction of the turn and the steering angle effected at the wheels 28 are controlled by electrical commands to the stepper motor 32. This same system would be employed for additional rear axles and associated wheels. The commands to the stepper motor will be based upon the given dimensions of various aspects of the tractor/trailer combination 10, the angle of articulation between the tractor 14 and trailer 12, and the geometric relationships that exist during a turn for a tractor/trailer combination. Certain assumptions are also employed to help determine the output of the stepper motor. The angle of articulation is first considered.

Figure 4:
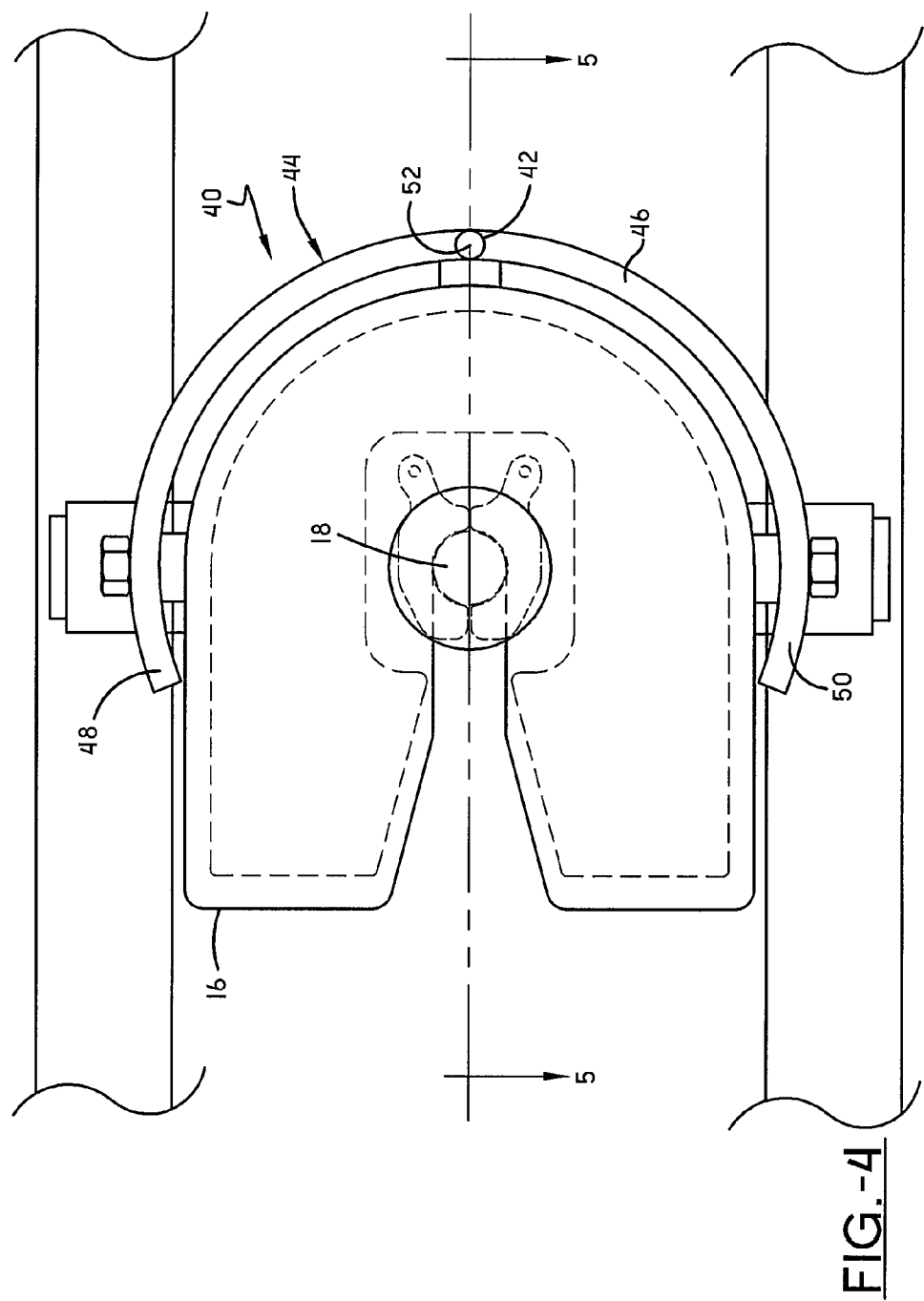
FIG. 4 is a top plan view of the connection of the fifth wheel and the kingpin, showing elements in accordance with this invention for determining an articulation angle between the tractor and the trailer.
Figure 5:
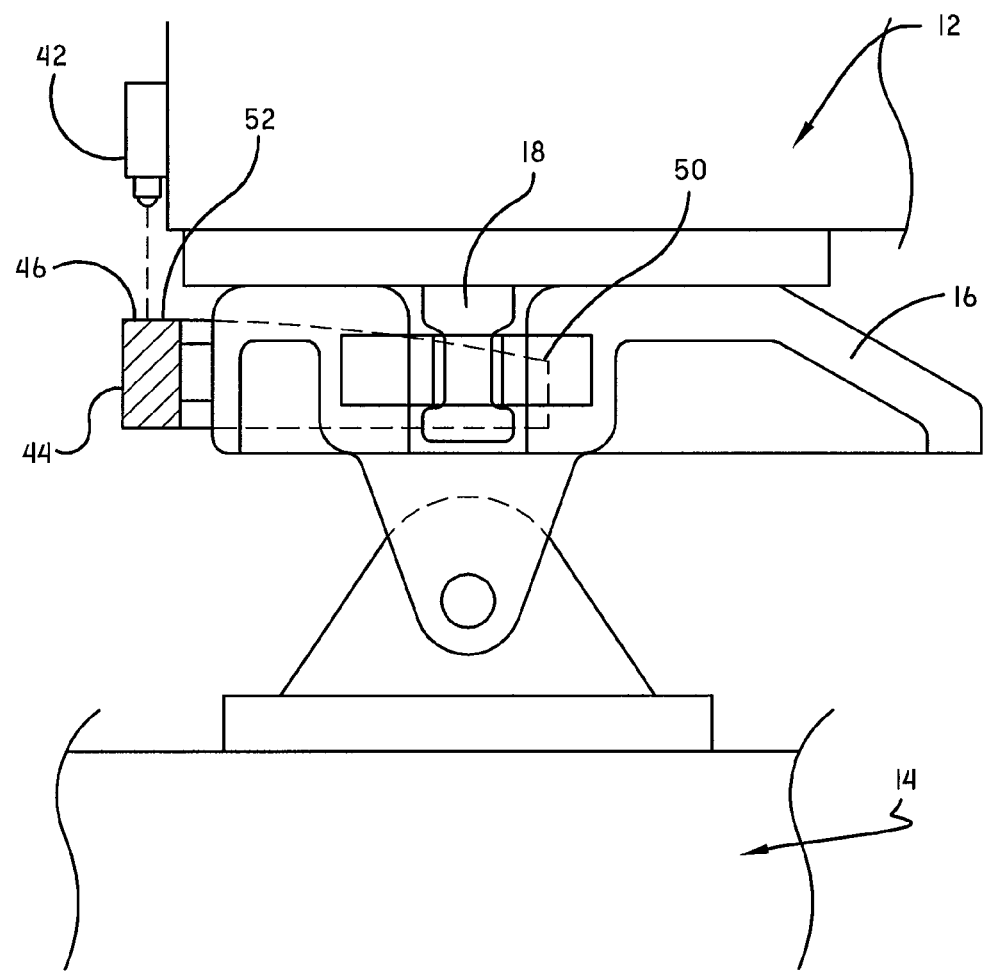
FIG. 5 is a cross sectional view along the line 6-6 in FIG. 5.

In accordance with one embodiment of the present invention, the articulation angle is determined by an optical system 40, as generally illustrated in FIGS. 4 and 5. In system 40, a laser distance sensor 42 or other appropriate non contact sensor or transducer is aimed at an articulation position strip 44 that is positioned in a semi-circle about the center of the fifth wheel 16 and the kingpin 18. The articulation position strip 44 varies in height along its length, such that the distance between the laser distance sensor 42 and the top surface of the articulation position strip 44 changes depending upon the degree to which the tractor 14 has articulated relative to the trailer 12. Thus, depending upon the angle of articulation between tractor 14 and trailer 12, the distance read by the laser distance sensor 42 and the sloped surface 46 of the articulation position strip 44 will be shorter or longer. The relationship between the distance between the laser distance sensor 42 and the sloped surface 46 of the articulation position strip 44 and the articulation angle associated with that distance can be loaded into a table in a microprocessor 47. Thus, by reading the distance between the laser distance sensor 42 and the sloped surface 46 and outputting this to the microprocessor 47, an articulation angle $\theta_{AA}$ can be generated for use by the microprocessor 47 in calculating the desired steering angle and outputting it to the stepper motor 32 for the rear axles of the trailer 12 (FIG. 3).

In this embodiment, the laser distance sensor 42 points down onto a sloped top surface 46 and serves to measure the distance between the laser and the sloped top surface. During a turn, the laser distance sensor moves relative to the sloped surface 46, and, depending upon the angle of articulation between tractor 14 and trailer 12, the distance read by the laser distance sensor 42 will be shorter or longer. A simple method to provide distance information is to form the articulation position strip 44 with a thick right turn end 48 and a thin left turn end 50, with a continuous slope therebetween defining the sloped surface 46. Alternatively, a peak could be provided at the center 52, with thin ends 48, 50, or the center 52 could be thin, with ends 48, 50 being thick. With a single thick right turn end 48 and thin left turn end 50, the distance read by laser distance sensor 42 at center 52 will, together with the distance read by laser distance sensor 42 during a turn, provide not only the articulation angle but also the direction of the turn. In the embodiment with a thick right turn end 48 and a thin left turn end 50, the center 52 provides a reference distance between the laser distance sensor 42 and the sloped surface, and distances read by laser distance sensor 42 that are less than this reference would indicate a left turn, while reading a distance greater than the reference would indicate a right hand turn.

Figure 6:
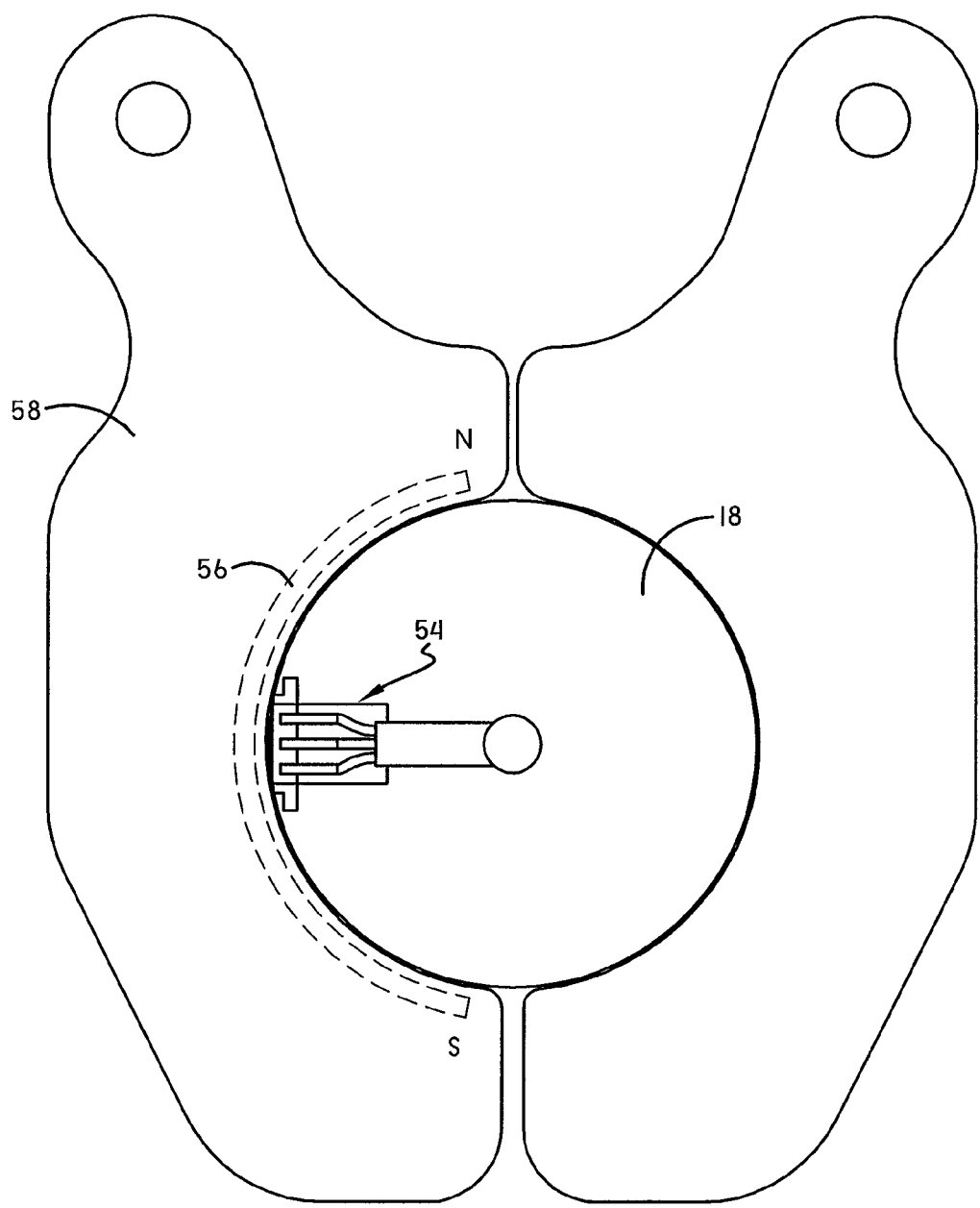
FIG. 6 is a top plan view of the connection of the fifth wheel and the kingpin, showing a second embodiment of elements for determining an articulation angle between the tractor and the trailer.

In another embodiment, a hall effect sensor system is employed to measure articulation angles. In FIG. 6, a hall sensor 54 is secured to the kingpin 18, and is aimed outwardly and aligned with magnet 56 secured to the fifth wheel lock 58, or otherwise associated with the tractor 14 to move relative to the hall sensor 54 to indicate an articulation angle. As will be appreciated by those skilled in the art, the output of the hall effect sensor is indicative of the articulation angle, and the articulation angle associated with a given reading at sensor 54 can be loaded into a table in a microprocessor 47 for generating the articulation angle for use in calculating the desired steering angle for the rear axles of the trailer.

Figure 7:
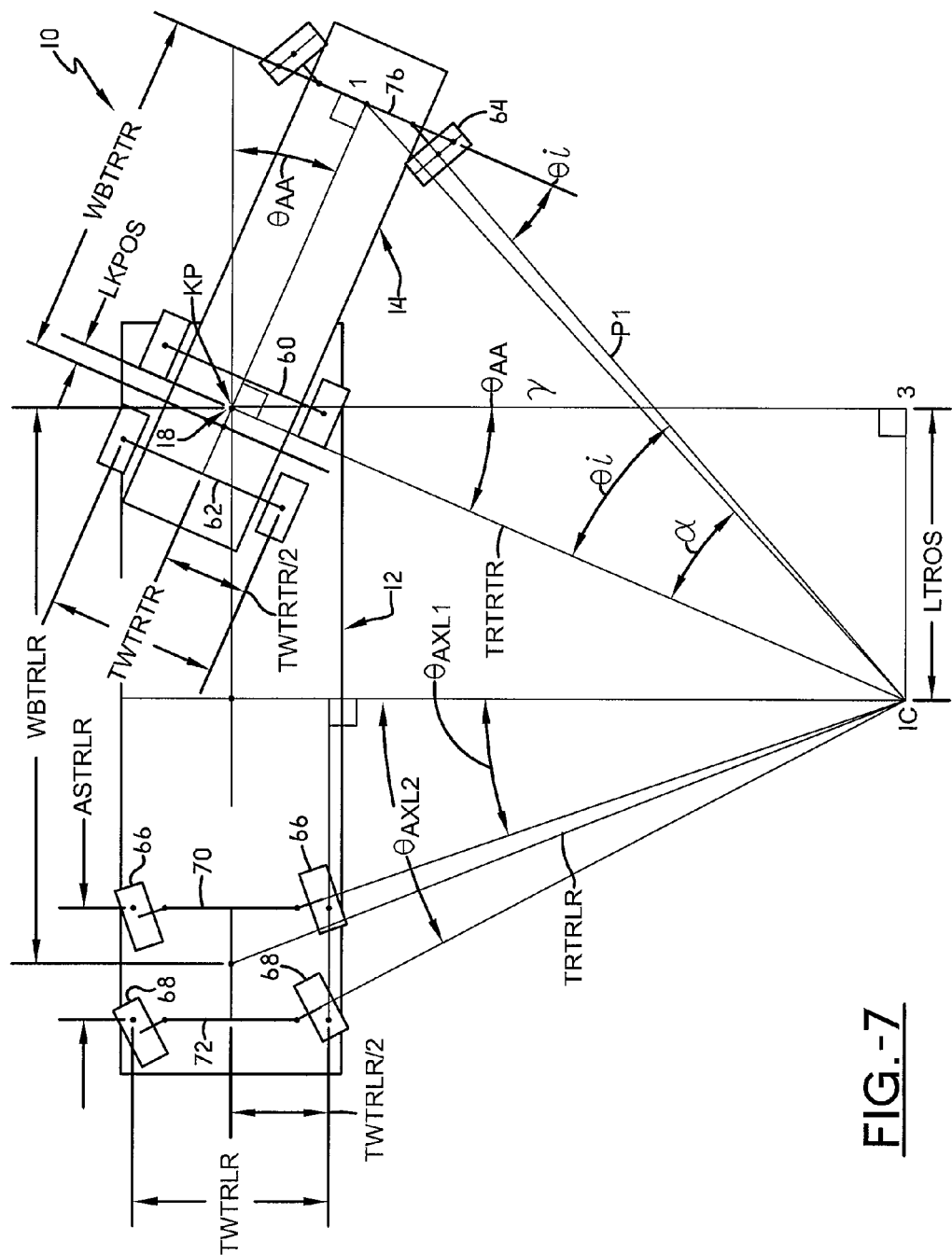
FIG. 7 is a general illustration of the geometry involved during the steering of a tractor/trailer combination, and is the geometry employed for computations made in accordance with this invention.

In FIG. 3, a rear axle 26 was shown by way of example to generally show how a stepper motor 32 is to be employed to move steerable wheels of a rear axle on a trailer. However, now more particular attention is focused on the particular dual axle trailer shown in FIG. 7, wherein a fore-most axle is designated by the numeral 70, having associated steerable wheels 66, and a rearward axle is designated by the numeral 72, having associated steerable wheels 68. The articulation angle generated by such means or other similar or dissimilar means can be used to calculate a desirable steering angle for the rear wheels 29, and the stepper motor 32 can be controlled to effect the desired steering. Referring now to FIG. 7, the articulation angle during a turn is shown as $\theta_{AA}$. This angle is read from a table as already disclosed, and a microprocessor 47 is programmed to employ the angle in calculations to output an appropriate control of stepper motor 32. The calculations are now provided.

In FIG. 7, a tractor/trailer combination is shown making a turn, with an articulation angle $\theta_{AA}$ established between the tractor 14 and the trailer 12. An instant center IC is established for the tractor 14 by extending a line through the kingpin 18 parallel to the rear axles 60, 62 and extending a line through the front inside wheel 64 of the tractor 14 until these lines intersect, as shown. Using geometric relationships and practical assumptions that will be described more fully below, the wheels 66, 68 of the rear axles 70, 72 of the trailer 12 are turned so that a line extending through the inside wheels 66, 68 also intersects this instant center IC. In this way, the trailer 12 turns around the same point (IC) as does the tractor 14. The following definitions will be helpful in considering the geometric relationships and calculations herein below:

$\theta_{AA}$ is the articulation angle between the tractor 14 and trailer 12;

$\theta i$ is the steering angle of the tractor 14 inside wheel;

LKPOS is the distance that the kingpin is offset from the midpoint between the rear axles of the tractor 14, TRTRTR is the turning radius of the tractor 14;

TRTRLR is the turning radius of the trailer 12;

WBTRTR is the wheel base of the tractor 14;

WBTRLR is the wheel base of the trailer 12;

LTROS is the distance that the instant center of the tractor is offset from the king pin along the length of the trailer;

ASTRLR is the distance between the rear axles 70, 72 of the trailer (the axle spread distance);

TWTRTR is the track width of the tractor 14;

TWTRLR is the track width of the trailer 12;

$\theta_{AXL1}$ is the steering angle for trailer rear axle 70 necessary for turning the inside wheel 66 about the instant center IC; and $\theta_{AXL2}$ is the steering angle for trailer rear axle 72 necessary for turning the inside wheel 68 about the instant center IC.

Figure 8:
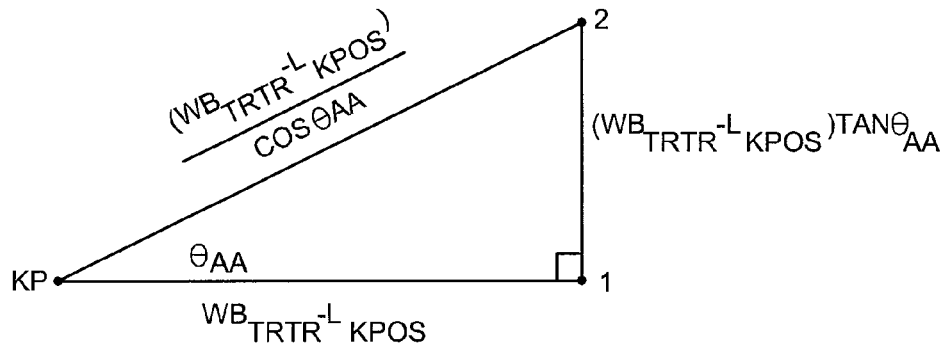
FIG. 8 is a representation of triangle KP-1-2 of FIG. 7.
Figure 9:
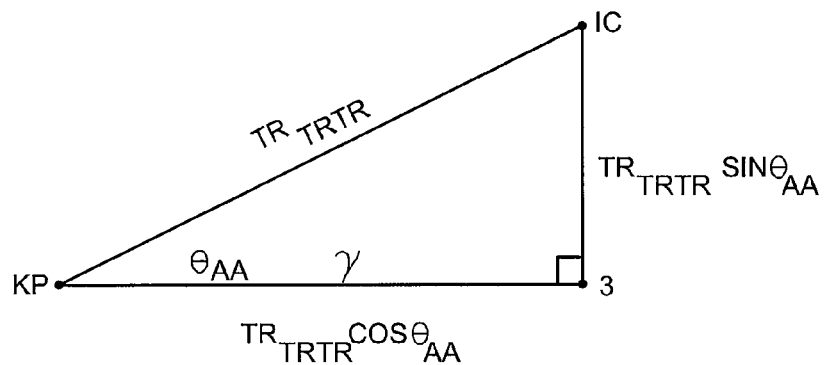
FIG. 9 is a representation of triangle KP-3-IC.
Figure 10:
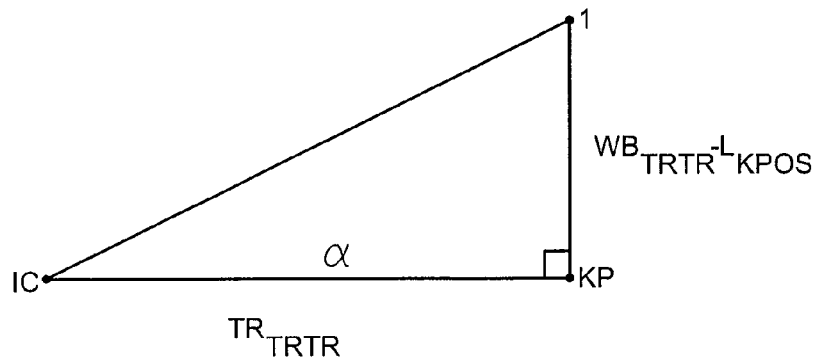
FIG. 10 is a representation of triangle IC-KP-1.
Figure 7:
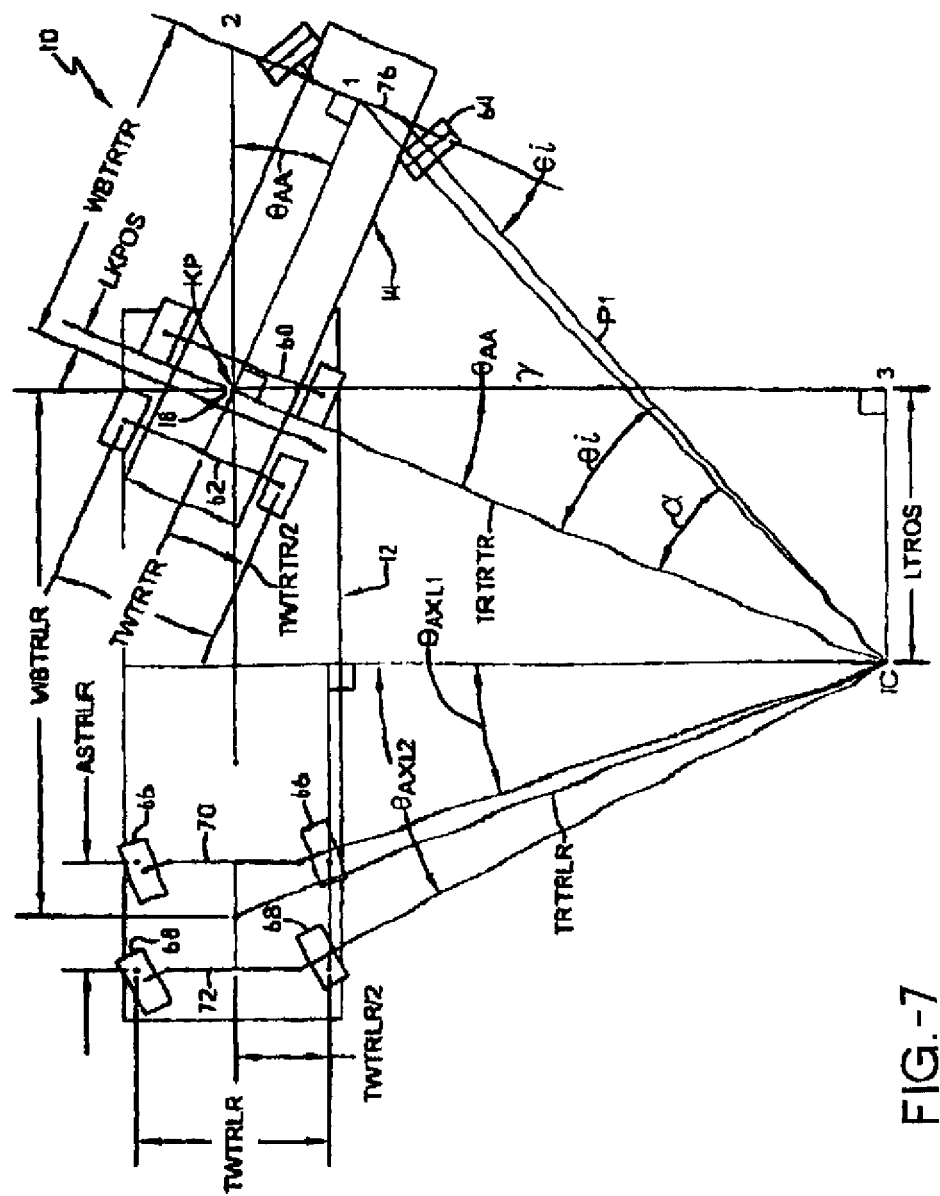

In FIGS. 7-9, it can be seen that a triangle KP-1-2 is defined by the intersections of a side KP-2, extending through the kingpin 18 along the centerline of the trailer 12; a side KP-1, extending through the kingpin 18 along the centerline of the tractor 14; and a side 1-2, extending perpendicularly through front axle 76 of tractor 14.

A second triangle KP-3-IC is defined by a side KP-IC, extending perpendicularly to the centerline of tractor 14 (also parallel to the rear axles 60, 62 through the kingpin 18; and a side KP-3, extending perpendicularly to the centerline of trailer 12 through kingpin 18, and a side IC-3, which is drawn from the instant center IC of the tractor 14 to create a right angle with side KP-3. Herein, the instant center IC is the position along the perpendicular extension through kingpin 18 (i.e. the extension shown by KP-IC) where the projection P1 of the inside wheel 64 intersects. Projection P1 is drawn perpendicularly to the inside wheel 74, as shown.

A third triangle IC-KP-1 is defined by a side IC-1 that extends from the instant center IC to the intersection of the centerline of tractor 14 and the front axle 76, and sides IC-KP and KP-1, as already disclosed.

Triangles KP-1-2 and KP-3-IC are congruent because they have the same interior angles, $\theta_{AA}$, 90, and 90-$\theta_{AA}$. For purposes of simplifying calculation, it is assumed that, during a turn, $\theta i$, ALPHA, and $\theta_{AA}$ are approximately equal. The assumption will not significantly affect the steering system, particularly because the concern is on significantly eliminating off tracking, and this assumption will not prevent that desired effect from being realized. Thus, triangles KP-1-2 and IC-KP-1 are considered similar as well. With this assumption, the ratio of side 1-2 to side KP-1 is treated as being equal to the ratio of side KP-1 to side KP-IC, which is the turning radius TRTRTR. Thus, with the understanding that WBTRTR is the length measured between the front axle 76 and the midpoint between the rear axles 60, 62, and LKPOS is the length to which the kingpin 18 is offset from that midpoint:

$$(((WBTRTR-LKPOS)\tan\theta_{AA})/(WBTRTR-LKPOS))= ((WBTRTR-LKPOS)/TRTRTR)$$

And, therefore:

$$TRTRTR=(WBTRTR-LKPOS)/\tan\theta_{AA} \quad (1)$$

WBTRTR and LKPOS are values that can be input into the microprocessor 47 because they will be non variable for a particular tractor/trailer 10.

LTROS is the length of side 3-IC of triangle KP-3-IC, and is the distance to which the instant center IC is set back from the kingpin 18 along the length of the trailer 12. Y is the length of side KP-3, and is the distance to which the instant center IC is offset from the centerline of the trailer 12. From the geometry shown:

$$LTROS=TRTRTR*\sin\theta_{AA} \quad (2)$$

$$Y=TRTRTR*\cos\theta_{AA} \quad (3)$$

the asterisk (*) being used as a multiplication symbol herein.

According to the invention, the stepper motor 32 is controlled by the microprocessor 47 to control the rear wheels of the trailer to also steer around the instant center IC of the tractor 14. Therefore, using additional geometric relationships, the angles $\theta AXL1$ and $\theta AXL2$ are calculated, and employed to calculate how to turn the rear wheels using the stepper motor 32. With the understanding that WBTRLR is the length measured between the kingpin 18 and the midpoint of the rear axles 70, 72 of the trailer 12; ASTRLR is the length between the rear axles 70, 72; and TWTRLR is the track width of the trailer rear axles:

$$\tan\theta AXL1=(WBTRLR-LTROS-(ASTRLR/2))/ (Y-(TWTRLR/2)) \quad (4)$$

$$\tan\theta AXL2=(WBTRLR-LTROS+ASTRLR/2)/Y- TWTRLR/2). \quad (5)$$

WBTRLR, ASTRLR and TWTRLR are values that can be input into the microprocessor 47 because they will be non variable for a particular tractor/trailer 10.

By incorporating equations (1), (2) and (3) into equations (4) and (5), the equations for $\tan\theta AXL1$ and $\tan\theta AXL2$ can be expressed solely by given, non variable values and a single reading of, $\theta_{AA}$, as in accordance with methods taught hereinabove.

$$\tan\theta AXL1=(WBTRLR-((WBTRTR-LKPOS)*\cos\theta_{AA})-ASTRLR/2)/(((WBTRTR-LKPOS)*(\cos\theta_{AA}/\tan\theta_{AA}))-TWTRLR/2) \quad (6)$$

$$\tan\theta AXL2=(WBTRLR-((WBTRTR-LKPOS)*\cos\theta_{AA})+ASTRLR/2)/(((WBTRTR-LKPOS)*(\cos\theta_{AA}/\tan\theta_{AA}))-TWTRLR/2) \quad (7)$$

The dual axle trailer as disclosed particularly above is very common and thus is the focus for this disclosure. However, it should be appreciated that a single axle trailer could be altered in accordance with this invention, with the equations above being altered by measuring WBTRLR as the distance between the kingpin and the single axle on the trailer, and expressing equation (4) above as:

$$\tan\theta AXL=(WBTRLR-LTROS)/(Y-(TWTRLR/2))$$

and solving accordingly. Multiple axles of three or more can be similarly handled in accordance with the teachings herein.

It will be appreciated that the turning angles of the rear wheels of the trailer are typically limited to 45 degrees maximum. Accordingly, so that the effect of the steering of rear wheels of the trailer can be optimized, a dead band angle of articulation will typically be employed such that the rear wheels of the trailer will not be turned by the stepper motor until the dead band or threshold angle of articulation is reached or exceeded, at which time the articulation angle employed for the calculation of a counter steering angle is the measured angle of articulation $\theta_{AA}$, minus the dead band angle $\theta_{DB}$. This dead band angle $\theta_{DB}$ will be a function of the tractor and trailer lengths, and is employed such that normal turns encountered on highways and entrance/exit ramps do not actuate the system, while preserving the turning activity of the trailer rear wheels for greater angles of articulation, where needed.

In accordance with an embodiment of this invention, a desirable dead band angle $\theta_{DB}$ is calculated by determining through the above equations what articulation angle $\theta_{AA}$, will require the rear most inside wheel of the trailer (e.g., wheel 68 in FIG. 7) to be turned to the maximum 45 degrees. Thus, $\theta AXL2$ is set to 45 degrees, and equation (7) becomes:

$$\tan 45=1=(WBTRLR-((WBTRTR-LKPOS)*\cos\theta_{AA})+ASTRLR/2)/(((WBTRTR-LKPOS)*(\cos\theta_{AA}/\tan\theta_{AA}))-TWTRLR/2)$$

and, thus:

$$(WBTRLR-((WBTRTR-LKPOS)*\cos\theta_{AA})+ASTRLR/2)=(((WBTRTR-LKPOS)*(\cos\theta_{AA}/\tan\theta_{AA}))-TWTRLR/2) \quad (8)$$

All values but $\theta_{AA}$ are given values dependent upon the dimensions of a given tractor/trailer combination, such that $\theta_{AA}$ can be calculated. The value calculated for a given tractor/trailer can be used to establish the dead band angle $\theta_{DB}$. By establishing a dead band, the sensor system 40 and its associated microprocessor 47 and stepper motor 32 can be programmed to prevent any turning of the rear axle wheels of the trailer until the articulation angle $\theta_{AA}$ has exceeded $\theta_{DB}$. Thus, the actual dead band spans an angle equal to twice $\theta_{DB}$ to account for both right and left hand turns.

In FIG. 11, a flow chart generally describes the trailer steering system 100. First, as in box 102, the relevant dimensions of the tractor 14 and trailer 12, as understood from the above equations and disclosure, are input into the microprocessor 47 for use in accordance with the equations provided. As in box 104, the microprocessor 47 can calculate a $\theta_{DB}$ based upon the maximum turning angle for the rear most wheels of the trailer 14. Then, the tractor/trailer may be driven and steered, and, as in box 106, during a turn, an articulation angle, $\theta_{AA}$, is read from an appropriate table, as taught herein. As seen in FIG. 11, if the articulation angle is less than $\theta_{DB}$, the rear wheels are not steered, but if the articulation angle is greater than $\theta_{DB}$, the rear wheels are steered according to the equations and geometric concepts covered herein.

EXAMPLE

An example for a calculation of a dead band angle is provided.

Let WBTRTR=11 feet
LKPOS=1 foot
WBTRLR=38 feet (ASTRLR\2)=2 feet
(TWTRLR\2)=3 feet Solving equation 8 yields $\theta_{AA}$ approximately equal to 16 degrees, indicating that the minimum turning radius of the trailer (TRTRLR) is approximately 44 feet. The dead band would be set to approximately 16 degrees on both a right and left hand turn, such that the dead band would actually span approximately 32 degrees along the particular system employed to read the articulation angle.

In light of the foregoing, it should thus be evident that the process of the present invention, providing a trailer steering system, substantially improves the art. In accordance with the patent rules, only the preferred embodiments of the present invention have been described in detail herein. However, also in accordance with patent rules, the present invention is not to be limited thereto or thereby. Rather, the scope of the invention shall include all modifications and variations that fall within the scope of the attached claims.

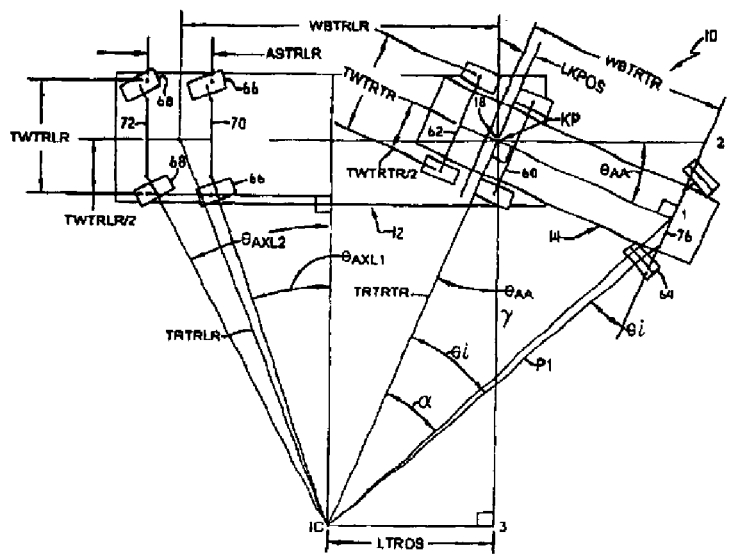

What is claimed is:

1. A trailer steering system for a tractor/trailer combination wherein a trailer is connected to a tractor through the connection of a kingpin with a fifth wheel, the trailer steering system comprising:
    a rear axle on the trailer having steerable wheels;
    means for measuring an articulation angle between the tractor and the trailer during a turn;
    a microprocessor for calculating a desired counter-steering angle for the steerable wheels of the rear axle, based upon the articulation angle measured by said means for measuring an articulation angle during a turn, with the caveat that a counter-steering angle is only calculated when the articulation angle is greater than a set threshold angle.

2. The trailer steering system of claim 1, wherein said means for measuring an articulation angle includes:
    a laser distance sensor mounted to the trailer; and
    a position strip mounted concentric to the fifth wheel and providing a sloped top surface, said laser distance sensor pointing to said sloped surface and reading the distance to the sloped surface, such that the distance to the sloped surface corresponds to a particular articulation angle between the tractor and trailer.

3. The trailer steering system of claim 2, wherein said means for measuring an articulation angle includes a hall sensor associated with the kingpin and a magnet associated with the fifth wheel.

4. The trailer steering system of claim 1, further comprising:
    a steering gearbox mounted to steer said steerable wheels of said rear axle; and
    a stepper motor, wherein said microprocessor operates the steering gearbox to effect the desired counter-steering angle.

5. A trailer steering system for a tractor/trailer combination wherein a trailer is connected to a tractor through the connection of a kingpin with a fifth wheel, the trailer steering system comprising:
    a rearward axle on the trailer having steerable wheels;
    a front-most axle on the trailer having steerable wheels, said front-most axle on the trailer being separated from said rearward axle on the trailer;
    a front axle on the tractor having steerable wheels;
    parallel, separated rear axles on the tractor;
    means for measuring an articulation angle between the tractor and the trailer during a turn;
    a microprocessor for calculating a desired counter-steering angle for the steerable wheels of the rearward axle, based upon the articulation angle measured by said means for measuring an articulation angle, with the caveat that a counter-steering angle is only calculated when the articulation angle is greater than a set threshold angle, wherein the microprocessor determines the desired counter steering angle of the steerable wheels of said front-most axle of the trailer and said rearward axle of the trailer according to the following equations:

$$\tan\theta_{AXL1} = (WBTRLR - ((WBTRTR - LKPOS)*\cos\theta_{AA}) - ASTRLR/2)/(((WBTRTR - LKPOS)*(\cos\theta_{AA}/\tan\theta_{AA})) - TWTRLR/2),\text{ and}$$

$$\tan\theta_{AXL2} = (WBTRLR - ((WBTRTR - LKPOS)*\cos\theta_{AA}) + ASTRLR/2)/(((WBTRTR - LKPOS)*(\cos\theta_{AA}/\tan\theta_{AA})) - TWTRLR/2),$$

wherein $\tan\theta_{AXL1}$ is the angle to which the steerable wheels on the front-most axle are to be turned off of the normal 0 degrees wherein the steerable wheels point parallel to the trailer length, $\tan\theta_{AXL2}$ is the angle to which the steerable wheels on the rearward axle are to be turned off of the normal 0 degrees wherein the steerable wheels point parallel to the trailer length, WBTRLR is the wheel base of the trailer measured from the kingpin to the midpoint between the front-most and rearward axles of the trailer, WBTRTR is the wheel base of the tractor measured between the front axle of the tractor having steerable wheels and the midpoint between the parallel, separated rear axles of the tractor, LKPOS is the distance that the kingpin is offset from the midpoint between the parallel, separated rear axles of the tractor, $\theta_{AA}$ is the articulation angle as measured by said means for measuring an articulation angle, ASTRLR is the distance between the front-most axle and rearward axle of the trailer, and TWTRLR is the track width of the trailer measured as the distance between the midpoints of the wheels of the rearward axle of the trailer.

6. The trailer steering system of claim 1 wherein the set threshold angle is calculated as a function of the maximum turning angle for said steerable wheels of said rear axle.

7. The trailer steering system of claim 6, wherein the tractor has a front axle with steerable wheels and parallel, separated rear axles, wherein the trailer includes a front-most axle having steerable wheels and a rearward axle having steerable wheels, the front-most axle being separated from the rearward axle, and wherein the maximum turning angle for said steerable wheels of said rearward axle is treated as being 45°, such that the threshold angle is determined according to the formula:

$$(WBTRLR - ((WBTRTR - LKPOS)*\cos\theta_{AA} + ASTRLR/2) = (((WBTRTR - LKPOS)*(\cos\theta_{AA}/\tan\theta_{AA})) - TWTRLR/2),$$

wherein WBTRLR is the wheel base of the trailer measured from the kingpin to the midpoint between the front-most and rearward axles of the trailer, WBTRTR is the wheel base of the tractor measured between the axle of the tractor having steerable wheels and the midpoint between the parallel, separated rear axles of the tractor, LKPOS is the distance that the kingpin is offset from the midpoint between the parallel, separated rear axles of the tractor, ASTRLR is the distance between the front-most axle and rearward axle of the trailer, TWTRLR is the track width of the trailer measured as the distance between the midpoints of the wheels of the rearward axle of the trailer, and $\theta_{AA}$ is the threshold angle.

* * * * *

UNITED STATES PATENT AND TRADEMARK OFFICE
CERTIFICATE OF CORRECTION

PATENT NO. : 7,793,965 B2  
APPLICATION NO. : 11/705331  
DATED : September 14, 2010  
INVENTOR(S) : Santo A. Padula Page 1 of 3

It is certified that error appears in the above-identified patent and that said Letters Patent is hereby corrected as shown below:

Delete the title page and substitute therefore the attached title page consisting of corrected illustrative figure.

At column 2, line 5, "the line 6-6 in FIG. 5" should read "the line 5-5 in FIG. 4."

At column 3, line 44, "left turn" should read "right hand turn."

At column 3, line 45, "right hand turn" should read "left hand turn."

At column 4, line 46, "perpendicularly through front axle 76" should read "perpendicularly to the center line of the tractor through front axle 76."

At column 4, line 50, ")", should be placed after "60, 62."

At column 4, line 58, reference numeral "74" should be "64."

At column 5, line 46, a "(", should be added before "Y" and after the "/".

At column 7, line 43, Claim 3 should be amended to depend from claim 1.

Signed and Sealed this
Twenty-second Day of March, 2011

David J. Kappos
*Director of the United States Patent and Trademark Office*

(12) United States Patent
Padula

(10) Patent No.: US 7,793,965 B2
(45) Date of Patent: Sep. 14, 2010

(54) TRAILER STEERING SYSTEM FOR A TRACTOR/TRAILER COMBINATION

(76) Inventor: Santo A. Padula, 4086 Turnberry Dr., Medina, OH (US) 44256

(*) Notice: Subject to any disclaimer, the term of this patent is extended or adjusted under 35 U.S.C. 154(b) by 632 days.

(21) Appl. No.: 11/705,331

(22) Filed: Feb. 12, 2007

(65) Prior Publication Data
US 2007/0216134 A1 Sep. 20, 2007

Related U.S. Application Data

(60) Provisional application No. 60/772,396, filed on Feb. 10, 2006.

(51) Int. Cl.
*B62D 53/06* (2006.01)
(52) U.S. Cl. .................. 280/426; 280/442; 280/443
(58) Field of Classification Search ............ 280/426, 280/442, 443
See application file for complete search history.

(56) References Cited

U.S. PATENT DOCUMENTS

| | | | | |
|---|---|---|---|---|
| 4,244,596 A * | 1/1981 | Chung | ............ | 280/426 |
| 4,463,966 A * | 8/1984 | Stoddard | ............ | 280/442 |
| 4,768,802 A * | 9/1988 | Winkler | ............ | 280/408 |
| 4,955,630 A * | 9/1990 | Ogren | ............ | 280/419 |
| 4,982,976 A * | 1/1991 | Kramer | ............ | 280/426 |
| 5,033,763 A * | 7/1991 | Daenens et al. | ............ | 280/426 |
| 5,123,669 A * | 6/1992 | Ducote | ............ | 280/426 |
| 5,197,751 A * | 3/1993 | Rankel | ............ | 280/426 |
| 5,201,836 A * | 4/1993 | DeWitt | ............ | 280/426 |
| 5,244,226 A * | 9/1993 | Bergh | ............ | 280/442 |
| 5,282,641 A * | 2/1994 | McLaughlin | ............ | 280/432 |
| 5,329,451 A * | 7/1994 | Notsu | ............ | 701/41 |
| 5,364,116 A * | 11/1994 | Houle et al. | ............ | 280/442 |
| 5,417,299 A * | 5/1995 | Pillar et al. | ............ | 180/412 |
| 5,479,999 A * | 1/1996 | Proia | ............ | 180/24.01 |
| 5,523,947 A * | 6/1996 | Breen | ............ | 701/36 |
| 5,536,030 A * | 7/1996 | Bettini | ............ | 280/433 |
| 5,558,350 A * | 9/1996 | Kimbrough et al. | ............ | 280/426 |
| 5,579,228 A * | 11/1996 | Kimbrough et al. | ............ | 701/41 |
| 5,607,028 A * | 3/1997 | Braun | ............ | 180/408 |
| 5,630,604 A * | 5/1997 | Ducote | ............ | 280/426 |
| 5,873,592 A * | 2/1999 | Daenens | ............ | 280/410 |
| 6,152,475 A * | 11/2000 | Poole | ............ | 280/426 |
| 6,257,611 B1 * | 7/2001 | Muldoon | ............ | 180/442 |
| 6,273,446 B1 * | 8/2001 | Paul | ............ | 280/448 |
| 6,308,976 B1 * | 10/2001 | Mitchell | ............ | 280/419 |
| 6,431,576 B1 * | 8/2002 | Vinod et al. | ............ | 280/442 |
| 6,450,523 B1 * | 9/2002 | Masters et al. | ............ | 280/426 |
| 6,494,476 B2 * | 12/2002 | Masters et al. | ............ | 280/426 |
| 6,854,557 B1 * | 2/2005 | Deng et al. | ............ | 180/445 |
| 2002/0180178 A1 * | 12/2002 | Masters et al. | ............ | 280/426 |
| 2006/0145450 A1 * | 7/2006 | Metternich et al. | ............ | 280/433 |

* cited by examiner

*Primary Examiner*—Lesley Morris
*Assistant Examiner*—Michael R Stabley
(74) *Attorney, Agent, or Firm*—Renner, Kenner, Greive, Bobak, Taylor & Weber

(57) ABSTRACT

A tractor/trailer combination wherein a trailer is connected to a tractor through the connection of a kingpin with a fifth wheel is provided with a trailer steering system. Using given dimensions of the tractor/trailer combination and a measured articulation angle between the tractor and trailer during a turn, the wheels of the rear axles of the trailer are turned so that they turn approximately about the instant center established for the tractor. In this way, the trailer turns around approximately the same point as does the tractor, thus significantly eliminating off tracking.

7 Claims, 8 Drawing Sheets